(12) United States Patent
Take

(10) Patent No.: US 7,255,922 B2
(45) Date of Patent: Aug. 14, 2007

(54) INORGANIC NANOPARTICLE AND METHOD FOR PRODUCING THE SAME

(75) Inventor: Seiji Take, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 11/128,818

(22) Filed: May 13, 2005

(65) Prior Publication Data

US 2005/0255319 A1 Nov. 17, 2005

(30) Foreign Application Priority Data

May 14, 2004 (JP) ............................. 2004-145310

(51) Int. Cl.
*B32B 5/16* (2006.01)
(52) U.S. Cl. ...................... 428/402; 428/403; 428/404; 428/405; 428/406
(58) Field of Classification Search ................ 428/402, 428/403, 404, 405, 406
See application file for complete search history.

(56) References Cited

U.S. PATENT DOCUMENTS 6,369,314 B1 * 4/2002 Nolas ......................... 136/201

2005/0268956 A1* 12/2005 Take ........................... 136/208
2006/0118158 A1* 6/2006 Zhang et al. ................ 136/205

OTHER PUBLICATIONS

"Nano-Engineered Thermoelectric Coating." Toprak, M. et al. © 2000 Kluwer Academic Publishers, Netherlands. pp. 149-156.
"Synthesis and Properties of Lead Selenide Nanocrystal Solids." Chen, Feng et al. © 2002 Materials Research Society. vol. 691. pp. G10.2.1-G10.2.6.
"Synthesis and Characterization of Nearly Monodisperse CdE (E=S, Se, Te) Semiconductor Nanocrystallites." Murray, C.B. et al. © 1993 American Chemical Society. vol. 115, No. 19. pp. 8706-8715.
"Monodisperse FePt Nanoparticles and Ferromagnetic FePt Nanocrystal Superlattices." Shouheng et a. © 2000 Science. vol. 287. pp. 1989-1992.

* cited by examiner

*Primary Examiner*—Leszek Kiliman
(74) *Attorney, Agent, or Firm*—Ladas & Parry LLP

(57) ABSTRACT

The main object of the present invention is to provide an inorganic nanoparticle being a skutterudite compound, expected to realize the quantum effect, and a method for producing the same.

The object of the present invention is achieved by providing an inorganic nanoparticle being a skutterudite compound, having the average particle size in a range of 2 nm to 100 nm.

8 Claims, No Drawings

INORGANIC NANOPARTICLE AND METHOD FOR PRODUCING THE SAME

BACKGROUND OF THE INVENTION

1. Field of the Invention

The present invention relates to an inorganic nanoparticle of a skutterudite compound that can be used for example for a thermoelectric conversion material and the like.

2. Description of the Related Art

The method for producing an inorganic nanoparticle can roughly be classified into the solid phase method, the liquid phase method and the gas phase method. As a method for producing an inorganic nanoparticle having a narrow particle size distribution, the liquid phase method and the gas phase method as the build up process are effective. In particular, the liquid phase method is excellent, since a chemically homogeneous composition can be provided in the case of two or more kinds of the constituent elements. The liquid phase method can be classified into the coprecipitation method, the reverse micelle method, and the hot soap method. Among them, the hot soap method has been recently attracted attentions as a method for producing an inorganic nanoparticle because it can provide a relatively high crystal property.

As the examples of inorganic nanoparticles produced using the hot soap method, the semiconductor materials showing the light emitting characteristics, such as CdSe, CdS and ZnS can mainly be presented (see the J. Am. Chem. Soc., 115, p. 8706-8715 (1993)). These semiconductor materials are known to show the sharper light emitting characteristics by the quantum effect by processing the same into nanoparticles. Application thereof is discussed mainly in the label field in bio and the display field.

Moreover, as to the magnetic recording material, in order to realize a high density recording by miniaturizing the size, synthesis of the inorganic nanoparticles using the hot soap method has been studied. As the magnetic recording materials produced by the hot soap method so far, specifically, Co, FePt, $CoPt_3$, and the like can be presented (see the Science, 1989, p. 287 (2000)).

On the other hand, although the thermoelectric conversion material is a material for directly converting the heat to the electricity, recently, a theory that the thermoelectric conversion efficiency can be increased by the quantum effect has been made public. Thereafter, the material study has been conducted, and it is known that a high performance of $ZT=2.4$ by the super lattice structure and $ZT=2$ by the quantum dot super lattice is provided. Since the high performance by the quantum effect can be expected also by processing the thermoelectric conversion material into the nanoparticles, synthesis of the inorganic nanoparticles using the hot soap method is also studied. As the thermoelectric conversion materials produced so far by the hot soap method, Bi, PbSe, and the like can be presented (see the Mat. Res. Soc. Symp., Proc., 691, G10. 2 (2002)).

The skutterudite compound is a material showing a high thermoelectric conversion performance. Particularly owing to the high mobility, deterioration of an electric conductivity due to interface scattering anticipated at the time of coupling the inorganic nanoparticles is expected to be restrained. The skutterudite compound is a compound represented by $MX_3$ (M: Co, Rh, Ir, X: P, As, Sb). Synthesis of $CoSb_3$ by hydrogen reduction after synthesizing inorganic nanoparticles including the oxides of co and Sb by the coprecipitation method has been reported so far (See Nanostructured Films and Coatings, p. 149-156 (2000)). However, since the particle size of the $CoSb_3$ particles synthesized by this method is 200 nm or more and it should be at least 100 nm or less for realizing the quantum effect, it is difficult to improve the performance. Moreover, a problem is involved in that whether or not the $CoSb_3$ particles are reduced to the center.

Moreover, synthesis of the inorganic nanoparticles of a skutterudite compound having a 100 nm or less particle size has not been reported.

SUMMARY OF THE INVENTION

The main object of the present invention is to provide an inorganic nanoparticle being a skutterudite compound, expected to realize the quantum effect, and a method for producing the same.

As a result of the elaborate discussion based on the above-mentioned circumstances, the present inventor has found that an inorganic nanoparticle being a skutterudite compound, having a 100 nm or less average particle size can be synthesized by using the hot soap method so as to achieve the present invention.

That is, the present invention provides an inorganic nanoparticle being a skutterudite compound and having the average particle size in a range of 2 nm to 100 nm.

According to the present invention, since it is an inorganic nanoparticle of a skutterudite compound, having the average particle size in a range of 100 nm or less, it is advantageous in that the thermoelectric conversion performance can be improved by the high mobility of the skutterudite compound and the quantum effect at the time of for example providing the thermoelectric conversion material using the inorganic nanoparticle of the present invention.

It is preferable that the inorganic nanoparticle of the present invention has a skutterudite crystal structure because the mobility can be made higher in the case the inorganic nanoparticle has a skutterudite crystal structure.

Moreover, the present invention provides a method for producing an inorganic nanoparticle to produce an inorganic nanoparticle being a skutterudite compound by the hot soap method.

According to the present invention, it is advantageous in that an inorganic nanoparticle having a narrow particle size distribution can be obtained by using the hot soap method. In the case of an inorganic nanoparticle being a skutterudite compound and having a narrow particle size distribution, the quantum effect can be performed effectively at the time of for example, the inorganic nanoparticle is compressed and shaped for producing a thermoelectric conversion material as well as it can easily be porous by generating voids between the inorganic nanoparticles, a phonon scattering effect by the porosity can also be expected. Since the thermal conductivity can be made smaller by scattering the phonon as the thermal conduction medium, the thermoelectric conversion performance can be improved.

In the invention, it is preferable that the skutterudite compound is $CoSb_3$. For producing an inorganic nanoparticle made of the $CoSb_3$, in general a cobalt compound is used. Since the cobalt compound is relatively inexpensive and easily accessible, it is advantageous. Moreover, since Sb has a low electro negativity and a high covalent bond property, it has a high mobility.

Moreover, at the time, it is preferable that an organic compound having 1 or more residues of a long chain alkyl group and 2 or more residues of a hydroxyl group in one molecule is used in the hot soap method. For producing an inorganic nanoparticle made of the $CoSb_3$, in general an antimony compound is used. In the case an antimony alkoxide is used as the antimony compound, by using the organic compound, the antimony alkoxide can be stabilized so that precipitation of an antimony oxide can be restrained.

Furthermore, according to the present invention, it is preferable that a 1-adamantane carboxylic acid or a 1-adamantane acetic acid is used in the hot soap method. By using the same, an inorganic nanoparticle having a skutterudite crystal structure can easily be obtained. The inorganic nanoparticle having a skutterudite crystal structure has a high mobility, and thus it is advantageous.

According to the present invention, since an inorganic nanoparticle of a skutterudite compound having a 100 nm or less average particle size can be produced by using the hot soap method, the effect of improving the thermoelectric conversion performance cab be realized by the high mobility and the quantum effect at the time of providing for example a thermoelectric conversion material using the inorganic nanoparticle.

DETAILED DESCRIPTION OF THE INVENTION

Hereinafter, an inorganic nanoparticle of the present invention, and a method for producing an inorganic nanoparticle will be explained in detail.

A. Inorganic Nanoparticle

An inorganic nanoparticle of the present invention is a skutterudite compound, having the average particle size in a range of 2 nm to 100 nm.

In general, at the time of shaping an inorganic powder, the compression shaping of compressing the inorganic powder at the ordinary temperature or while heating is carried out. In the case this method is applied for producing a thermoelectric conversion material using an inorganic nanoparticle, the interface is formed among the inorganic nanoparticles at the time of the compression shaping so that the electric conductivity may be deteriorated due to scattering of the electrons by the interface. On the other hand, since the skutterudite compound has a high thermoelectric conversion performance, in particular, a high mobility, it is expected that the electric conductivity deterioration by the interface scattering can be restrained so as to contribute for an improvement of the performance by producing a thermoelectric conversion material using an inorganic nanoparticle of the skutterudite compound.

Here, a high conversion efficiency from the thermal energy to the electric energy is required to the thermoelectric conversion material. That is, the following performances are required. (1) A voltage generated at the time of providing a temperature difference is preferably large so that a high thermoelectric power per the temperature difference 1K is required. (2) In the case the electric resistance is large, since the energy is lost by the Joule's heat at the time an electric current is supplied, a smaller electric resistance is preferable. (3) Since the thermal energy to be converted to the electric energy is escaped as the heat due to the thermal conduction, a smaller thermal conductivity is preferable. From these facts, the characteristics of the thermoelectric conversion material can be dominated by the value represented by the below formula (i) referred to as a performance index Z.

$$Z = S^2 \cdot \sigma / k \quad (i)$$

(wherein, S is the thermoelectric power, $\sigma$ is the electric conductivity, and k is the thermal conductivity.)

A material having a larger performance index Z can provide more excellent thermoelectric conversion material.

As mentioned above, since the skutterudite compound has a high mobility and the electric conductivity is high, even in the case the electric conductivity is lowered by the interface scattering, the deterioration can be restrained, and thus the performance index Z is considered to be made larger.

Moreover, in general, the particle size of realizing the quantum effect is said to be 100 nm or less.

According to the present invention, since it is an inorganic nanoparticle of a skutterudite compound, having a 100 nm or less average particle size, for example at the time of providing a thermoelectric conversion material using an inorganic nanoparticle of the present invention, it is advantageous in that the thermoelectric conversion performance can be improved by the high mobility and quantum effect.

The skutterudite compound in the present invention is a compound represented by $MX_3$. Here, M is at least one element selected from the group consisting of Co, Rh and Ir, and X is at least one element selected from the group consisting of P, As and Sb. In the present invention, among the elements mentioned above, M is preferably Co. For producing an inorganic nanoparticle made of the $CoX_3$, in general a cobalt compound is used. Since the cobalt compound is relatively inexpensive and easily accessible, it is advantageous. Moreover, among the elements mentioned above, X is preferably Sb. Since Sb has low electro negativity and a high covalent bond property, it has a high mobility. Therefore, the skutterudite compound is most preferably $CoSb_3$.

The average particle size of the inorganic nanoparticles of the present invention is in a range of 2 nm to 100 nm. More preferably it is in a range of 2 nm to 30 nm, and particularly preferably it is in a range of 2 nm to 10 nm. In the case the average particle size is too large, the quantum effect may not be realized. On the other hand, in the case of inorganic nanoparticles having the average particle size smaller than the above-mentioned range, it is hard to produce.

The above-mentioned average particle seize is the value obtained by selecting an area confirmed to have the presence of 20 or more inorganic nanoparticles among the images obtained using a scanning electron microscope (SEM) or a transmission electron microscope (TEM) for the inorganic nanoparticle of the present invention, measuring the particle sizes of the all inorganic nanoparticles in the area, and calculating the average value. However, the inorganic nanoparticles not focused appropriately and blurred are excluded from the measurement subject.

Moreover, it is preferable that the standard deviation of the average particle size of the inorganic nanoparticles is 40% or less, more preferably it is 20% or less, and particularly preferably it is 10% or less. At the time of compression shaping of the inorganic nanoparticles for producing a thermoelectric conversion material using the inorganic nanoparticle of the present invention, since the standard deviation is in the above-mentioned range, the quantum effect can be performed effectively as well as voids are generated among the inorganic nanoparticles so as to be easily porous, and thus the phonon scattering effect by the porosity can be expected. Since the phonon is a heat conductive medium, by scattering the phonon, the thermal conductivity can be lowered so that the performance index Z in the formula (i) can be made larger. In the case the standard deviation of the average particle size is in the above-mentioned range accordingly, the thermoelectric conversion performance can further be improved by the quantum effect and the phonon scattering effect.

The inorganic nanoparticle of the present invention may either be crystalline or amorphous, but it is particularly preferably be crystalline. That is, it is preferable that the inorganic nanoparticle of the present invention has the skutterudite crystal structure. Since the inorganic nanoparticle has the skutterudite crystal structure, the mobility can be made higher. On the other hand, in the case the inorganic nanoparticle is amorphous, the inorganic nanoparticle of the present invention can be processed to be crystalline by for example heating at the time of using the inorganic nanoparticle of the present invention for the thermoelectric conversion material.

The skutterudite crystal structure of the inorganic nanoparticle can be confirmed by the X ray diffraction analysis.

As the applications for the inorganic nanoparticles of the present invention, for example, a thermoelectric conversion material, an infrared ray sensor, or the like, utilizing the high thermoelectric conversion performance, a wiring material, a diode, a transistor, or the like, utilizing the high mobility can be presented.

Moreover, it is preferable that the inorganic nanoparticle of the present invention is produced by the hot soap method. By using the hot soap method, the inorganic nanoparticles having a narrow particle size distribution can be obtained. Since the method for producing an inorganic nanoparticle by the hot soap method will be disclosed in the item of "B. Method for producing an inorganic nanoparticle" to be described below, explanation thereof is omitted here.

B. Method for Producing an Inorganic Nanoparticle

Next, the method for producing an inorganic nanoparticle will be explained. According to the method for producing an inorganic nanoparticle of the present invention, an inorganic nanoparticle being a skutterudite compound is produced by the hot soap method.

Here, the hot soap method is a method of promoting the crystal core formation and the crystal growth by the reaction commenced as a result of the thermal decomposition of at least 1 kind of a precursor of a compound to be targeted in a dispersing agent heated to a high temperature. For the purpose of controlling the reaction rate of the processes of the core formation and the crystal growth of the crystal, a dispersing agent having an appropriate coordination force to the constituent elements of a targeted compound is used as the essential component for providing a liquid phase medium. Since the state of stabilizing the crystal by coordination by the dispersing agent is similar to the state of stabilizing oil droplet in water by the soap molecules, this reaction is referred to as the hot soap method.

In the present invention, by using the hot soap method, the inorganic nanoparticles having a narrow particle size distribution can be obtained, and thus it is advantageous. In the case of the inorganic nanoparticles having a narrow particle size distribution, for example at the time of compression shaping of the inorganic nanoparticles for producing a thermoelectric conversion material, the quantum effect can be performed effectively as well as voids are generated among the inorganic nanoparticles so as to be easily porous, and thus the phonon scattering effect by the porosity can be expected. By obtaining the phonon scattering effect in addition to the quantum effect, the thermoelectric conversion performance can further be improved.

In the present invention, in order to produce the inorganic nanoparticles using the hot soap method, a method of heating a dispersing agent and injecting a precursor including the constituent elements of the inorganic nanoparticles to the heated dispersing agent can be used.

Hereinafter each constituent of the method for producing an inorganic nanoparticle of the present invention will be explained.

Precursor

First, a precursor used in the present invention will be explained.

Since an inorganic nanoparticle produced by the present invention is a skutterudite compound, a precursor used in the present invention is not particularly limited as long as it includes the constituent elements of the skutterudite compound disclosed in the item of "A. Inorganic nanoparticle" and it is capable of forming the inorganic nanoparticles. For example, for producing an inorganic nanoparticle made of $CoSb_3$, a cobalt compound and an antimony compound can be used as the precursor. Moreover, for producing an inorganic nanoparticle, for example made of $RhSb_3$, a rhodium compound and an antimony compound can be used as the precursor. Accordingly, in the present invention, a compound including a constituent element (Co, Rh, Ir, P, As, Sb) of the skutterudite compound can be used according to a skutterudite compound to be targeted.

At the time, the mixing ratio of the compounds including the constituent elements of the skutterudite compound may be set based on the stoichiometry ratio of the skutterudite compound to be targeted.

The skutterudite compound to be produced by the present invention is most preferably $CoSb_3$. Since the cobalt compound to be the precursor is relatively inexpensive and easily accessible, it is advantageous. Moreover, since Sb has a low electro negativity and a high covalent bond property, it has a high mobility.

The cobalt compound to be used for the precursor is not particularly limited as long as it is dissolved homogeneously in a dispersing agent to be described later. For example, an organometal compound of a cobalt can be presented. Specifically, a cobalt carbonyl, a biscyclopentadienyl cobalt, a cobalt acetate, a cobalt acetyl acetonate, or the like, such as $[CO_2(CO)_8]$, $[CO_4(CO)_{12}]$, $[CO_6(CO)_{16}]$, and the like can be used.

Moreover, the antimony compound to be used for the precursor is not particularly limited as long as it is dissolved homogeneously in a dispersing agent to be described later. For example, an organometal compound of an antimony can be presented. Specifically, an antimony alkoxide, an antimony acetate, an antimony triphenyl, or the like can be used.

The precursor used in the present invention may either be a gas, a liquid or a solid at an ordinary temperature. In the case the precursor is liquid at an ordinary temperature, since it can be used as it is, it is advantageous in terms of the convenience in the production operation. Moreover, in the case the precursor is solid or liquid at a room temperature, it may be used in a state dissolved or dispersed in a solvent as needed. As such a solvent, alkanes such as a n-hexane, a n-heptane, a n-octane, an isooctane, a nonane, and a decane, aromatic hydrocarbons such as a benzene, a toluene, a xylene and a naphthalene, ethers such as a diphenyl ether and a di(n-octyl) ether, halogen based hydrocarbons such as a chloroform, a dichloromethane, a dichloroethane, a monochlorobenzene, and a dichlorobenzene, amines such as a n-hexyl amine, a n-octyl amine, a tri(n-hexyl) amine, and a tri(n-octyl) amine, alcohols, compounds to be used for a dispersing agent to be described later, or the like can be presented. Among these examples, the halogen based hydrocarbons, the alcohols, or the amines can be used preferably.

Moreover, in the case at least one kind of the precursors is a gas, it may be introduced into the solvent or a dispersing agent to be described later by being dissolved by bubbling, or the like, or the gas may be introduced directly into a reaction liquid phase with the other precursors injected.

Dispersing Agent

Next, a dispersing agent used in the present invention will be explained.

The dispersing agent used in the present invention is not particularly limited as long as it is a substance to be stabilized by the coordination to microcrystals in a high temperature liquid phase. For example, trialkyl phosphines such as a tributyl phosphine, a trihexyl phosphine, and a trioctyl phosphine, organic phosphorous compounds such as a tributyl phosphine oxide, a trihexyl phosphine oxide, a trioctyl phosphine oxide and a tridecyl phosphine oxide, ω-amino alkanes such as an octyl amine, a decyl amine, a dodecyl amine, a tetradecyl amine, a hexadecyl amine and an octadecyl amine, tertiary amines such as a tri(n-hexyl) amine, and a tri(n-octyl) amine, organic nitrogen compounds such as an aromatic compound including a nitrogen like a pyridine, a lutidine, a collidine, and quinolines, dialkyl sulfoxides such as a dibutyle sulfide, dialkyl sulfoxides such as a dimethyl sulfoxide and a dibutyl sulfoxide, organic sulfur compounds such as an aromatic compound including a sulfur like a thiophene, higher fatty acids such as a palmitic acid, a stearic acid and an oleic acid, alcohols, a 1-adamantane carboxylic acid, a 1-adamantane acetic acid, or the like can be presented. Among these examples, the ω-amino alkanes and the like having 12 or more carbons such as a dodecyl amine, a hexadecyl amine and an octadecyl amine can be used preferably.

Moreover, according to the present invention, it is preferable to use a 1-adamantane carboxylic acid or a 1-adamantane acetic acid as the dispersing agent. By using the dispersing agents, an inorganic nanoparticle having the skutterudite crystal structure can easily be obtained. An inorganic nanoparticle having the skutterudite crystal structure has a high mobility, and thus it is advantageous.

In the present invention, in the case of producing an inorganic nanoparticle being the skutterudite compound including Sb as the constituent element as represented by $MSb_3$ (M: Co, Rh, Ir) and an antimony alkoxide is used as the precursor, it is preferable that an organic compound having 1 or more residues of a long chain alkyl group and 2 or more residues of a hydroxyl group in one molecule is used as the dispersing agent. By using such an organic compound, the antimony alkoxide can be stabilized so that precipitation of the antimony oxide can be restrained. As the organic compound, specifically, a long chain alkyl-1, 2-diol, or the like can be presented.

The dispersing agents may be used alone or as a mixture of a plurality of kinds as needed.

Moreover, the dispersing agent may be diluted with a solvent and used. As such a solvent, for example, aromatic hydrocarbons such as a toluene, a xylene and a naphthalene, long chain alkanes such as an octane, a decane, a dodecane, and an octadecane, ethers such as a diphenyl ether, a di(n-octyl) ether, and a tetrahydrofuran, a halogen based hydrocarbon, or the like can be presented.

(3) Method for Producing an Inorganic Nanoparticle

In the present invention, an inorganic nanoparticle can be produced by heating the dispersing agent and injecting the precursor to the heated dispersing agent.

The heating temperature for the dispersing agent is not particularly limited as long as it is a temperature capable of melting the dispersing agent and precursor. Although it may vary depending upon the pressure condition, or the like, it is in general 60° C. or higher. Moreover, it is preferable that the heating temperature is relatively high. By setting the same at a high temperature so as to decompose the precursor injected to the dispersing agent collectively, a large number of cores are produced at the same time, and thus an inorganic nanoparticle having a relatively small particle size can easily be obtained.

Moreover, the method for injecting the precursor to the heated dispersing agent is not particularly limited as long as it is a method capable of forming an inorganic nanoparticle. Moreover, it is preferable to carry out the precursor injection for one time further preferably within a short time in order to obtain an inorganic nanoparticle having a relatively small particle size. In the case of having a large particle size, the injection may be executed by a plurality of times and it may be carried out continuously.

The reaction temperature at the time of forming the inorganic nanoparticle after injecting the precursor to the heated dispersing agent is not particularly limited as long as it is a temperature capable of melting the dispersing agent and precursor or dissolving the same in a solvent, and capable of generating the crystal growth. Although it may vary depending upon the pressure condition, or the like, it is in general 100° C. or higher.

After producing the inorganic nanoparticle by injecting the precursor to the dispersing agent as mentioned above, in general the inorganic nanoparticle is separated from the dispersing agent. As the separation method, for example, the sedimentation methods such as the centrifugal separation, the floatation and the foam separation, the filtration methods such as the cake filtration and the clarifying filtration, and the squeeze method can be presented. In the present invention, among the above-mentioned examples, the centrifugal separation can be used preferably. However, the inorganic nanoparticles obtained after the separating operation are obtained in many cases as a mixture with a small amount of a dispersing agent.

At the time of the separation, in the case the sedimentation of the inorganic nanoparticles is difficult due to too small a size of the inorganic nanoparticles, in order to improve the sedimentation property, additives like alcohols having 1 to 4 carbons such as an acetonitrile, a methanol, an ethanol, a n-propyl alcohol, an isopropyl alcohol, a n-butyl alcohol, an isobutyl alcohol, a secondary butyl alcohol and a tert butyl alcohol, aldehydes such as a formaldehyde, an acetaldehyde, an acrolein, and a crotonaldehyde, ketones having 3 to 5 carbons such as an acetone, a methyl ethyl ketone, and a diethyl ketone, ethers having 2 to 4 carbons such as a dimethyl ether, a methyl ethyl ether, a diethyl ether, and a tetrahydrofuran, and organic nitrogen containing compounds having 1 to 4 carbons such as a methyl amine, a dimethyl amine, a trimethyl amine and a dimethyl formamide can be used. Among these examples, water, or alcohols such as a methanol and an ethanol can be used preferably. The above-mentioned additives may be used either alone or as a mixture of two or more kinds.

In the present invention, the above-mentioned inorganic nanoparticles are produced in general under an inert gas atmosphere such as an argon gas and a nitrogen gas.

Since the inorganic nanoparticles produced by the present invention are same as those disclosed in the item of "A. Inorganic nanoparticle", explanation thereof is omitted here.

The present invention is not limited to the embodiments mentioned above. The embodiments are merely examples, and any one having substantially same configuration as the technological idea disclosed in the scope of the claims of the present invention and the same effects is included in the technological scope of the present invention.

EXAMPLES

Hereinafter, the present invention will be explained specifically with reference to the examples and the comparative example.

Example 1

The reaction field of the hot soap method was provided by the below dispersing agent and solvent.

| <Dispersing agent> | |
|---|---|
| 1,2-hexadecane diol (produced by ALDRICH) | 1.2 g |
| 1-adamantane carboxylic acid (produced by ACROS) | 0.76 g |
| Hexadecyl amine (produced by KANTO KAGAKU.) | 12 g |
| <Solvent> | |
| Diphenyl ether (produced by KANTO KAGAKU.) | 6 ml |

The above-mentioned dispersing agent and solvent were mixed in a flask and heated to 150° C. after the substitution by an argon gas atmosphere.

Next, as a precursor including Sb, 0.26 g of a butoxy antimony (produced by AZmax.co) was injected to the reaction field. Subsequently, as a precursor including Co, a solution with 0.043 g of a cobalt carbonyl (produced by KANTO KAGAKU.) mixed and dissolved in 0.4 ml of a dichlorobenzene (produced by KANTO KAGAKU.) was injected to the reaction field.

After the injection of the precursors, the temperature was raised to 230° C. so as to be maintained at the temperature for 40 minutes. Thereafter, the reaction solution was cooled down by the air. At the time it was cooled down to 60° C., 50 ml of an ethanol was added. The black precipitated substance was separated from the reaction solution by the centrifugal separation, and then washed with a solvent mixture of chloroform/ethanol=1/2 (volume ratio) so as to obtain black powders. According to the transmission electron microscope observation of the obtained black powders, it was found out that they have a spherical shape with about a 10 nm average particle size, and a crystal lattice was observed. Moreover, according to the X ray diffraction analysis, it was confirmed that the black powders have a skutterudite crystal structure of $CoSb_3$.

Example 2

In the same manner as in the example 1 except that the dispersing agent and the solvent mixed in a flask and substituted by an argon gas atmosphere was heated to 80° C. instead of 150° C. in the example 1, an inorganic nanoparticle was produced. The obtained black powders were confirmed to have a spherical shape with about a 100 nm average particle size by the transmission electron microscope observation. Moreover, according to the X ray diffraction analysis, it was confirmed that the black powders have a skutterudite crystal structure of $CoSb_3$.

Example 3

The reaction field of the hot soap method was provided by the below dispersing agent and solvent.

| <Dispersing agent> | |
|---|---|
| 1,2-hexadecane diol (produced by ALDRICH) | 1.2 g |
| 1-adamantane carboxylic acid (produced by ACROS) | 0.76 g |
| Hexadecyl amine (produced by KANTO KAGAKU.) | 12 g |
| <Solvent> | |
| Diphenyl ether (produced by KANTO KAGAKU.) | 6 ml |

The dispersing agent and solvent were mixed in a flask and heated to 230° C. after the substitution by an argon gas atmosphere.

Next, a solution produced by mixing and dissolving the below precursor in the below solvent was injected to the reaction field.

| <Precursor> | |
|---|---|
| Butoxy antimony (produced by AZmax.co) | 0.26 g |
| Cobalt carbonyl (produced by KANTO KAGAKU.) | 0.043 g |
| <Solvent> | |
| Dichlorobenzene (produced by KANTO KAGAKU.) | 2 ml |
| 1-hexadecanol (produced by ALDRICH) | 1.0 g |

After the injection of the precursor, it was maintained at 230° C. for 40 minutes. Thereafter, the reaction solution was cooled down by the air. At the time it was cooled down to 60° C., 50 ml of an ethanol was added. The black precipitated substance was separated from the reaction solution by the centrifugal separation, and then washed with a solvent mixture of chloroform/ethanol=1/2 (volume ratio) so as to obtain black powders. According to the transmission electron microscope observation of the obtained black powders, it was found out that they have a spherical shape with about a 2 nm average particle size, and a crystal lattice was observed. Moreover, according to the X ray diffraction analysis, it was confirmed that the black powders have a skutterudite crystal structure of $CoSb_3$.

Example 4

In the same manner as in the example 1 except that 0.76 g of an oleic acid (produced by KANTO KAGAKU.) was added instead of the 1-adamantane carboxylic acid in the example 1, an inorganic nanoparticle was produced. According to the X ray diffraction analysis of the obtained black powders, it was confirmed that no peak was detected by the XRD spectrum and thus the black powders were amorphous. Moreover, according to the scanning electron microscope observation, it was found out that the black powders have a spherical shape with about a 50 nm average particle size. Moreover, the black powders were heated at 700° C. for 10 hours under a nitrogen gas atmosphere. Although the external appearance remained as the black powders, it was confirmed that the black powders have a skutterudite crystal structure of CoSb3 according to the X ray diffraction analysis.

Comparative Example 1

In the same manner as in the example 1 except that the 1,2-hexadecane diol was not used in the example 1, an inorganic nanoparticle was produced. At the time the butoxy antimony was added, white precipitation was generated.

According to the X ray diffraction analysis of the obtained white precipitation, it was confirmed that the white precipitation was $Sb_2O_3$.

What is claimed is:

1. An inorganic nanoparticle being a skutterudite compound and having an average particle size in a range of 2 nm to 100 nm.

2. The inorganic nanoparticle according to claim 1, having a skutterudite crystal structure.

3. A method for producing an inorganic nanoparticle to produce an inorganic nanoparticle being a skutterudite compound by a hot soap method.

4. The method for producing an inorganic nanoparticle according to claim 3, wherein the skutterudite compound is $CoSb_3$.

5. The method for producing an inorganic nanoparticle according to claim 4, wherein an organic compound having 1 or more residues of a long chain alkyl group and 2 or more residues of a hydroxyl group in one molecule is used in the hot soap method.

6. The method for producing an inorganic nanoparticle according to claim 3, wherein a 1-adamantane carboxylic acid or a 1-adamantane acetic acid is used in the hot soap method.

7. The method for producing an inorganic nanoparticle according to claim 4, wherein a 1-adamantane carboxylic acid or a 1-adamantane acetic acid is used in the hot soap method.

8. The method for producing an inorganic nanoparticle according to claim 5, wherein a 1-adamantane carboxylic acid or a 1-adamantane acetic acid is used in the hot soap method.

* * * * *